United States Patent [19]

Woolly

[11] 3,993,492
[45] Nov. 23, 1976

[54] WATER SOLUBLE TRANSFER COATING MATERIAL AND ARTICLES INCORPORATING SAME

[76] Inventor: Otis Bill Woolly, 1702 Lyndale, Ennis, Tex. 75119

[22] Filed: Apr. 14, 1975

[21] Appl. No.: 567,819

[52] U.S. Cl. .................................. 106/19; 106/22; 106/23; 106/31; 106/272; 101/473
[51] Int. Cl.² .................. C09D 11/12; C09D 3/387; C09D 3/393
[58] Field of Search .............................. 106/21–23, 106/31, 32, 270–272; 101/473

[56] References Cited
UNITED STATES PATENTS

| | | | |
|---|---|---|---|
| 2,589,306 | 3/1952 | Steiner | 106/22 |
| 2,623,827 | 12/1952 | Moos | 106/23 |
| 3,076,406 | 2/1963 | Florence | 101/473 X |
| 3,627,546 | 12/1971 | Coppeta | 106/19 |
| 3,653,944 | 4/1972 | Ehrhardt et al. | 106/31 X |

OTHER PUBLICATIONS

Kirk–Othmer, Encyclopedia of Chemical Technology, 2nd Ed., vol. 10, pp. 651–659.

Primary Examiner—Joan E. Welcome
Attorney, Agent, or Firm—Thomas L. Cantrell; Joseph H. Schley

[57] ABSTRACT

Disclosed is a water soluble transfer material of the kind in which transfer is accomplished by localized application of pressure on a portion of the material to implant or transfer part of it to a selected surface. The transfer material is a multi-component mixture including a non-resinated dry pigment having an average particle size between one and five microns, a first polyethylene glycol having a molecular weight in the range of 2,000 to 4,500, a second polyethylene glycol having a molecular weight in the range of 6,000 to 7,500, a third polyethylene glycol having a molecular weight in the range of 400 to 800, a non-ionic emulsifier or plasticizer, and optionally an inert filler. Articles incorporating the transfer material include seamtress' transfer paper, business carbon paper, crayons, lecture pencils, and the like. The transferred markings are readily removed from the receptor surface by water when this is so desired.

10 Claims, No Drawings

WATER SOLUBLE TRANSFER COATING MATERIAL AND ARTICLES INCORPORATING SAME

BACKGROUND OF THE INVENTION

In various arts transfer materials are used to make marks at desired locations on receptor surfaces. A common mode of accomplishing the transfer is to bring a body of the transfer material into juxtaposition with the receptor surface, then to apply and remove pressure upon the transfer material against the surface, thereby separating a portion of the transfer material from the bulk or body thereof and adhering it mechanically to the receptor surface. Another mode of transfer sometimes used is to pick up a portion of a body of transfer material with a carrier liquid, and to carry the picked-up portion by an application device to the surface, and to thereafter remove the carrier liquid, as by evaporation, from the applied portion of the transfer material. Examples of the first transfer mode include dressmaker's transfer or tracing paper, business carbon paper, and children's crayons. An example of the second transfer mode is the art of brush water color painting from cakes of water color paint.

In many instances, the transferred marking has only a temporary utility, and it is thereafter desired that it be readily removed from the receptor surface. An example is the dressmaker's guide marks on cloth after the seams have been sewn. In other instances, the transfer material, in addition to being transferred to the desired locations on the receptor surfaces, gets transferred to a variety of other undesirable locations. For example, a child may color the living room wall with his crayons as well as coloring in his coloring book. In such instances, it is desirable that the transfer material be readily removed from the undesired locations.

In the dressmaking art, tracing papers or transfer papers are employed in the following manner. The tracing paper is placed on a hard surface with the coated side up and the receptor fabric is placed on top of it. A pattern with suitable markings thereon is placed on top of the fabric, and pressure is applied to the marks on the pattern sheet by means of a tracing wheel or other instrument. The application of pressure results in transfer of some of the colored coating of the tracing paper to the under surface of the fabric. This transferred material must ultimately be removed from the fabric after it is cut and sewn. Usually this is done by washing or dry cleaning.

The transfer materials used to form coatings on dressmaker's tracing paper in the past have commonly consisted of high melting point vegetable or mineral waxes, petroleum oils, pigments and dyes. Successful removal of such materials from fabrics requires the use of extremely hot water (180° F to 200° F) and detergents, or the use of dry cleaning methods. Even so, such harsh procedures are not always successful in removing the markings.

Man made fibers, such as polyesters, acetate rayon, orlon, acrylon, nylon, dacron, dynel, and others are often susceptible to color fading and fiber damage when subjected to hot water and detergents. Such synthetic fabrics require cold water washing, which as is pointed out above, is ineffective for removing tracing paper markings.

SUMMARY OF THE INVENTION

In accordance with the present invention, a transfer material is provided which when formed into or incorporated into transfer articles such as tracing paper and crayons is cold water soluble and has excellent transfer properties. The transfer material of the invention is of the hot-melt type and includes a pigment material and a vehicle for the pigment, as well as a filler in its preferred forms. The vehicle is a mixture of three polyethylene glycols and a non-ionic emulsifier or plasticiser. The three polyethylene glycols in the vehicle mixture have different average molecular weights. One is a medium weight polyethylene glycol having a molecular weight in the range of 2,000 to 4,500. Another is a heavy polyethylene glycol having a molecular weight in the range of 6,000 to 7,500. The third polyethylene glycol is a low molecular weight material having a molecular weight in the range of 400 to 800. This combination of polyethylene glycols with different average molecular weights, together with the non-ionic emulsifier, produces a transfer material with excellent flow properties, which are necessary both in the process of forming transfer articles, such as tracing paper, and in the transfer process itself. This combination of materials also produces excellent cold water solubility for the transfer material. Single polyethylene glycols, of whatever average molecular weight, and other mixtures of polyethylene glycols of varying molecular weights do not produce the water solubility and flow properties of the present invention.

The coloring material employed in the invention is a dry pigment of the desired color having an average particle size between about one and about five microns. The pigment must be of the non-resinated type. If resinated pigments are employed, they tend to adhere to the fabric or other receptor surface and thus resist removal upon the application of cold water. Dyes are also unsuitable coloring materials for use in accordance with the invention since they absorb or otherwise interact into the fabric fiber, and are therefore difficult to remove upon application of cold water.

DESCRIPTION OF THE PREFERRED EMBODIMENTS

Medium Weight Polyethylene Glycol Component

The preferred medium weight polyethylene glycol is one having a molecular weight in the range of 3,000 to 4,000, a specific gravity of approximately 1.204 at 20° centigrade, and a melting point of about 54° centigrade. Such a material is commercially available from the Union Carbide Corporation under the designation Carbowax 4,000. Alternate commercially available materials include one designated Polyglycol E2,000, marketed by Dow Chemical, having an average molecular weight of about 2,100, a specific gravity at 25° centigrade of about 1.210, and a melting point of 42°–46° centigrade; a material marketed by Dow Chemical under the designation Polyglycol E4,000, having an average molecular weight of about 4,500, a specific gravity at 25° centigrade of about 1.212, and a melting point of about 55°–60° centigrade; a material marketed by Dow Chemical under the designation Polyethylene Glycol 4,000 USP, having an average molecular weight of about 3,400, a specific gravity of about 1.212 at 25° centigrade, and a melting point of about 53° to 56° centigrade. All of these materials have a low toxicity, as do the other polyethylene glycols discussed hereinbelow. Low toxicity is of considerable advantage in the application of the present invention to children's crayons.

Heavy Polyethylene Glycol Component

The preferred high molecular weight polyethylene glycol is one having a molecular weight in the range of 6,000 to 7,500, a specific gravity of approximately 1.207 at 20° centigrade and a melting point about 62° centigrade. Such a material is commercially available from Union Carbide Corporation under the designation Carbowax 6,000. An alternate commercially available material is Polyglycol E6,000, available from Dow Chemical, having an average molecular weight of about 7,500, a specific gravity of 1.212 at 25° centigrade, and a melting point of about 57° to 62° centigrade.

Low Molecular Weight Polyethylene Glycol Component

The preferred low molecular weight polyethylene glycol is a methoxy polyethylene glycol having a molecular weight range of 700 to 800, a specific gravity of approximately 1.094 at 20° centigrade, and a melting point about 30° centigrade. Such a material is commercially available from Union Carbide Corporation under the designation Carbowax 750. Alternate materials include Carbowax 400 (Union Carbide), having a molecular weight of about 400, a specific gravity of approximately 1.1281 at 20° centigrade, and a melting point of 4° to 8° centigrade; Carbowax 600 (Union Carbide), having a molecular weight range of about 570 to about 630, a specific gravity of about 1.1279 at 20° centigrade, and a melting point of about 20° to 25° centigrade; Polyglycol E600 (Dow Chemical), having an average molecular weight of about 600, a specific gravity of about 1.126 at 25° centigrade, and a melting point of about 20° to 25° centigrade; Poly-G polyethylene glycol PG600 (Olin Chemicals), having a molecular weight range of about 570 to about 630, a specific gravity at 20° centigrade of about 1.127, and a melting point of about 18° to 24° centigrade; and Poly-G polyethylene glycol PG400 (Olin Chemicals), having a molecular weight of about 400, a specific gravity of about 1.127 at 20° centigrade, and a melting point of about 3° to 10° centigrade.

Non-ionic Emulsifier

The preferred non-ionic emulsifier is one having a specific gravity of approximately 1.08 at 20° centigrade, a flash point of 400° to 550° F, and an acid number from 0 to 3, and a saponification number between 100 and 120. A polyoxyethylene-4-sorbitan monolaurate, having these properties, is marketed by Atlas Chemical Industries, Inc. under the designation Tween 21. Another suitable non-ionic emulsifier is one marketed by Atlas Chemical Industries under the designation Renex 20, which is polyoxyethylene esters of mixed fatty and resin acids. Still other non-ionic emulsifiers which may be used include polyols designated Pluronic L61, L62, and L64, marketed by BASF Wyandotte Corporation. In fact, a wide variety of emulsifiers are usable in the present invention. The table set out below illustrates some of the many chemical types of emulsifiers which may be employed.

EMULSIFIERS

Sorbitan trioleate
Sorbitan tristearate
Polyethylene sorbital hexastearole
Propylene glycol monostearate
Glycerol monostearate
Sorbitol monooleate
Diethylene glycol monooleate
Diethylene glycol monolaurate
Sorbitan monopalmitate
Tetraethylene glycol monooleate
Sorbitan monolaurate
Polyoxyethylene sorbitan monostearate
Polyoxyethylene sorbitan tristearate
Polyoxyethylene monopalmitate
Polyoxyethylene monolaurate
Polyoxyethylene sorbitan monolaurate
Polyoxyethylene cetyl alcohol
Polyoxyethylene monostearate

Pigment Component

As is pointed out above, the pigments employed in the present invention must be non-resinated dry pigments having an average particle size between 1 to 5 microns. Dyes are not suitable since they absorb into fabric fibers and other receptor surfaces. A wide variety of pigments meeting the foregoing requirements are available and may be used; typical examples include barium lithol pigment, titanium dioxide, benzidine yellow, lithol red, iron blue, etc. Furthermore, pigments may be blended to produce desired shades.

Filler Component

Kaolin, or other inert materials of fine particle size may be incorporated into the compositions of the invention. However, they may be omitted if desired.

Formulation Ranges

In accordance with the invention, the percentage by weight of the emulsifier may be between about 8 to about 35 percent; the proportion of the medium molecular weight polyethylene glycol may be between about 15 and about 50 percent; the proportion of the high molecular weight polyethylene glycol may be between about 20 and about 30 percent; the proportion of the low molecular weight polyethylene glycol may be between about 17 and about 27 percent; the proportion of pigment may be between about 2 and about 8 percent; and the filler may range in proportion from none at all to about 3 percent for transfer coating materials, and even more for crayon-type materials.

There is no intention to be limited to a particular theory for explanation of the various functions fulfilled by the several components of the invention, nor the superiority of the particular composition of materials involved, but it can be pointed that the emulsifier component is thought to act as a wetting agent for the pigment and to make the polyethylene glycols pliable and transferable. The emulsifier imparts a certain "stickiness" to the material. The high molecular weight polyethylene glycol hardens the material and gives it sufficient sturdiness, both in the transfer paper application of the invention and in the pencil or crayon application.

The compositions of the invention are aptly described as "hot melt" materials, because they are solids at ordinary temperatures and can be rendered into liquid form by the application of heat, repeatedly, if necessary. The materials have good storage life, and if desired, after grinding and formulating the composition may be allowed to cool and remain for any reasonable period of time before use. For use, the composition is remelted by heating to a range of from about 190° F to 230° F and employed in the liquid form by application to a substrate or pouring into a forming mold or other forming device.

The compositions are completely soluble in cold water, even after transfer to a receptor substrate. They may also be removed from substrates by ordinary dry cleaning methods. The compositions are smudge resistant, both when applied to a substrate and after transfer from the substrate to a receptor substrate, as well as in massive form such as in a crayon. The compositions may be applied to the entire surface of a substrate or to selected portions thereof. The manner in which they are applied to a substrate for transfer paper purposes may be by roll coating, wire coating or other conventional methods.

The type of substrate which may be employed in the dressmaker's transfer paper and carbon paper applications of the invention includes tissues, bond papers, and newsprint, as well as other conventional papers. When used for business carbon paper, the compositions provide an inexpensive and easy means of removing the transferred coating for security reasons, or for recycling of the paper. The compositions have excellent shelf life when applied to a substrate or formed into a crayon, and produce clear, dark and intense impressions when transferred to a receptor surface. The materials, in the transfer paper form, can be transferred more than once, i.e., they are not limited to "single-use" applications, as are some transfer materials.

The invention may further be understood by consideration of the following working examples:

EXAMPLE I

TRANSFER COATING COMPOSITION

| | Percent by weight |
|---|---|
| Polyoxyethylene-4-sorbitan monolaurate | 30 |
| Polyethylene glycol (mol. wt. 3000–4000) | 22 |
| Polyethylene glycol (mol. wt. 6000–7500) | 22 |
| Methoxy polyethylene glycol (mol. wt. 700–800) | 22 |
| Barium lithol pigment | 3 |
| Kaolin | 1 |
| | 100 |

Sand mill grind from ¼ to ½ hour or ball mill grind from 4 to 6 hours.

The above ingredients are ground together to a fineness of 1 to 5 microns in a heated (190° to 230° F) ball mill, sand mill, attritor, roller mill or by any one of many conventional methods apparent to those skilled in the art.

Since the composition is advantageously applied as a hot melt, the grinding is conveniently effected at increased temperatures, whereby, if desired, the composition is directly applied upon leaving the grinder to the substrate by conventional means to produce the substrate article.

Care should be exercised so that the grinding apparatus is clean of any materials previously ground in the apparatus such as paraffins, montain wax, carnauba wax, petroleum oils, pigments and dyes used in other transfer coatings. Such water insoluble materials are incompatible with this invention and as such are impurities which defeat the primary object of the invention.

Any number of color variations may be obtained from the above formulation by substituting pigment materials selected from a group consisting of iron blue, titanium dioxide, benzidine yellow, etc.

EXAMPLE II

MARKING PENCIL COMPOSITION

| | Percent by weight |
|---|---|
| Polyoxyethylene-4-sorbitan monolaurate | 11 |
| Iron blue pigment | 5 |
| Polyethylene glycol (mol. wt. 3000–4000) | 42 |
| Polyethylene glycol (mol. wt. 6000–7500) | 21 |
| Methoxy polyethylene glycol (mol. wt. 700–800) | 21 |
| | 100 |

Sand mill grind from ¼ to ½ hour or ball mill grind from 4 to 6 hours.

The above ingredients are heated to 190° F to 230° F and ground together for a length of time sufficient to obtain the required fineness of grind in a heated ball mill, sand mill, attritor, roller mill, etc. The ground composition may be poured into pencil molds or other forming devices apparent to those skilled in the art and allowed to cool. The pencils are water soluble and may be used to mark substrates directly.

What is claimed is:

1. A water soluble transfer material adapted for pressure transfer to a receptor surface and removable from said surface by application of cold water, consisting essentially of:
   from about 8 to about 35% by weight of a non-ionic emulsifier;
   from about 15 to about 50% by weight of a medium molecular weight polyethylene glycol having an average molecular weight between about 2,000 and about 4,500;
   from about 20 to about 30% by weight of a high molecular weight polyethylene glycol having an average molecular weight between about 6,000 and about 7,500;
   from about 17 to about 27% by weight of a low molecular weight polyethylene glycol having an average molecular weight between about 400 and about 800; and
   from about 2 to about 8% by weight of a color imparting non-resinated pigment having an average particle size between about 1 and about 5 microns.

2. A composition in accordance with claim 1 which includes an inert filler.

3. A composition in accordance with claim 2 in which said filler is Kaolin.

4. A composition in accordance with claim 2 in which said filler is present in an amount between 0% and about 3%.

5. A composition in accordance with claim 1 in which said non-ionic emulsifier has a specific gravity of about 1.08 at 20° centigrade, a flash point of 400°–500° F, an acid number of 0–3 and a saponification number between 100–120.

6. A composition in accordance with claim 1 in which said medium molecular weight polyethylene glycol has an average molecular weight between about 3,000 and about 4,000, a specific gravity of about 1.204 at 20° centigrade, and a melting point of about 54° centigrade.

7. A composition in accordance with claim 1 in which said high molecular weight polyethylene glycol has an average molecular weight between about 6,000 and about 7,500, a specific gravity of about 1.207 at 20° centigrade, and a melting point of about 54° centigrade.

8. A composition in accordance with claim 1 in which said low molecular weight polyethylene glycol has an average molecular weight between about 700 and about 800, a specific gravity of about 1.094 at 20° centigrade and a melting point about 30° centigrade.

9. A transfer article comprising a substrate sheet with a thin layer of the composition of claim 1 bonded thereon.

10. A marking instrument comprising a generally cylindrical body of the composition of claim 1.

* * * * *